United States Patent
Kalhan

(10) Patent No.: US 11,895,624 B2
(45) Date of Patent: Feb. 6, 2024

(54) MINI-SLOT CONFIRMATION CHANNEL TRANSMISSION IN V2V COMMUNICATIONS

(71) Applicant: Kyocera Corporation, Kyoto (JP)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 507 days.

(21) Appl. No.: 17/282,984

(22) PCT Filed: Oct. 2, 2019

(86) PCT No.: PCT/US2019/054214
§ 371 (c)(1),
(2) Date: Apr. 5, 2021

(87) PCT Pub. No.: WO2020/076574
PCT Pub. Date: Apr. 16, 2020

(65) Prior Publication Data
US 2021/0345297 A1 Nov. 4, 2021

Related U.S. Application Data

(60) Provisional application No. 62/891,061, filed on Aug. 23, 2019, provisional application No. 62/891,107, (Continued)

(51) Int. Cl.
*H04W 72/02* (2009.01)
*H04W 4/40* (2018.01)
(Continued)

(52) U.S. Cl.
CPC ........... *H04W 72/02* (2013.01); *H04L 5/0048* (2013.01); *H04L 5/0051* (2013.01); *H04W 4/40* (2018.02);
(Continued)

(58) Field of Classification Search
None
See application file for complete search history.

(56) References Cited

U.S. PATENT DOCUMENTS

2019/0380132 A1* 12/2019 Hu .......................... H04W 4/70
2020/0396639 A1* 12/2020 Hofmann ................ H04L 69/18
2020/0404625 A1* 12/2020 Roth-Mandutz ...... H04W 76/14

FOREIGN PATENT DOCUMENTS

| WO | 2013/049959 A1 | 4/2013 |
| WO | 2017/195538 A1 | 11/2017 |
| WO | 2018/172136 A1 | 9/2018 |

OTHER PUBLICATIONS

3GPP TSG-RAN WG1 Meeting #94-Bis, On Mode 2 Resource Allocation for NR Sidelink, Chengdu, China, Oct. 8-12, 2018, Tdoc R1-1811594, pp. 1-10, (Year: 2018).*

(Continued)

*Primary Examiner* — Kouroush Mohebbi

(57) ABSTRACT

A network configures (e.g., allocates) reservation channel resources within a reservation channel resource pool, comprising at least one time-slot comprising a set of mini-slots, and transmits information regarding the reservation channel resource pool to at least one wireless communication device of a vehicle ad-hoc network. A wireless communication device interested in transmitting a reservation channel transmission selects, from the reservation channel resource pool, time-frequency resources for a reservation channel transmission. The wireless communication device also selects a number of mini-slots over which to repeatedly transmit the reservation channel transmission. The wireless communication device repeatedly transmits the reservation channel transmission over the selected number of mini-slots, using the selected time-frequency resources. In response to the reservation channel transmissions, at least one other wireless communication device transmits, to the wireless communi- (Continued)

cation device, one or more confirmation channel transmissions, each of which are repeatedly transmitted over a second number of mini-slots.

15 Claims, 6 Drawing Sheets

Related U.S. Application Data filed on Aug. 23, 2019, provisional application No. 62/891,147, filed on Aug. 23, 2019, provisional application No. 62/743,852, filed on Oct. 10, 2018.

(51) Int. Cl.
*H04W 28/26* (2009.01)
*H04W 72/0446* (2023.01)
*H04W 72/0453* (2023.01)
*H04W 4/46* (2018.01)
*H04L 5/00* (2006.01)

(52) U.S. Cl.
CPC ............ *H04W 4/46* (2018.02); *H04W 28/26* (2013.01); *H04W 72/0446* (2013.01); *H04W 72/0453* (2013.01)

(56) References Cited

OTHER PUBLICATIONS

ERICSSON; "On Mode 2 Resource Allocation for NR Sidelink, " R1-1811594; 3GPP TSG-RAN WG1 Meeting #94-Bis; Sep. 28, 2018; Chengdu, CN.

Park, Seung-Hoon, Jun Suk Kim, Jaheon Gu, Min Young Chung; "Novel D2D resource partitioning and allocation scheme for SC-FDMA-based public safety systems"; Transactions on Emerging Telecommunications Technologies; John Wiley & Sons, Ltd; Aug. 19, 2016 (https://doi.org/10.1002/ett.3093).

\* cited by examiner

MINI-SLOT CONFIRMATION CHANNEL TRANSMISSION IN V2V COMMUNICATIONS

CLAIM OF PRIORITY

The present application claims priority to Provisional Application No. 62/743,852 filed Oct. 10, 2018, entitled "RESERVATION CHANNEL TRANSMISSION IN V2V COMMUNICATIONS", Provisional Application No. 62/891,061 filed Aug. 23, 2019, entitled "RESERVATION CHANNEL TRANSMISSION IN V2V COMMUNICATIONS", Provisional Application No. 62/891,107 filed Aug. 23, 2019, entitled "MINI-SLOT RESERVATION CHANNEL TRANSMISSION IN V2V COMMUNICATIONS", and Provisional Application No. 62/891,147 filed Aug. 23, 2019, entitled "MINI-SLOT CONFIRMATION CHANNEL TRANSMISSION IN V2V COMMUNICATIONS", which is assigned to the assignee hereof and hereby expressly incorporated by reference in its entirety.

FIELD

This invention generally relates to wireless communications and more particularly to confirmation channel transmissions between wireless communication devices.

BACKGROUND

A vehicle ad-hoc network (VANET) is an autonomously created wireless network of vehicles. In some VANETs, the wireless communication devices, which are located within the vehicles of the VANET, autonomously select the time-frequency resources for data transmissions to other vehicles within the VANET. However, if the number of transmitting vehicle-to-vehicle (V2V) devices is large with respect to the resources available for data transmissions, the probability of data transmission collisions is high.

SUMMARY

A network configures (e.g., allocates) reservation channel resources within a reservation channel resource pool, comprising at least one time-slot comprising a set of mini-slots, and transmits information regarding the reservation channel resource pool to at least one wireless communication device of a vehicle ad-hoc network. A wireless communication device interested in transmitting a reservation channel transmission selects, from the reservation channel resource pool, time-frequency resources for a reservation channel transmission. The wireless communication device also selects a number of mini-slots over which to repeatedly transmit the reservation channel transmission. The wireless communication device repeatedly transmits the reservation channel transmission over the selected number of mini-slots, using the selected time-frequency resources. In response to the reservation channel transmissions, at least one other wireless communication device transmits, to the wireless communication device, one or more confirmation channel transmissions, each of which are repeatedly transmitted over a second number of mini-slots.

DETAILED DESCRIPTION

Figure 1A:
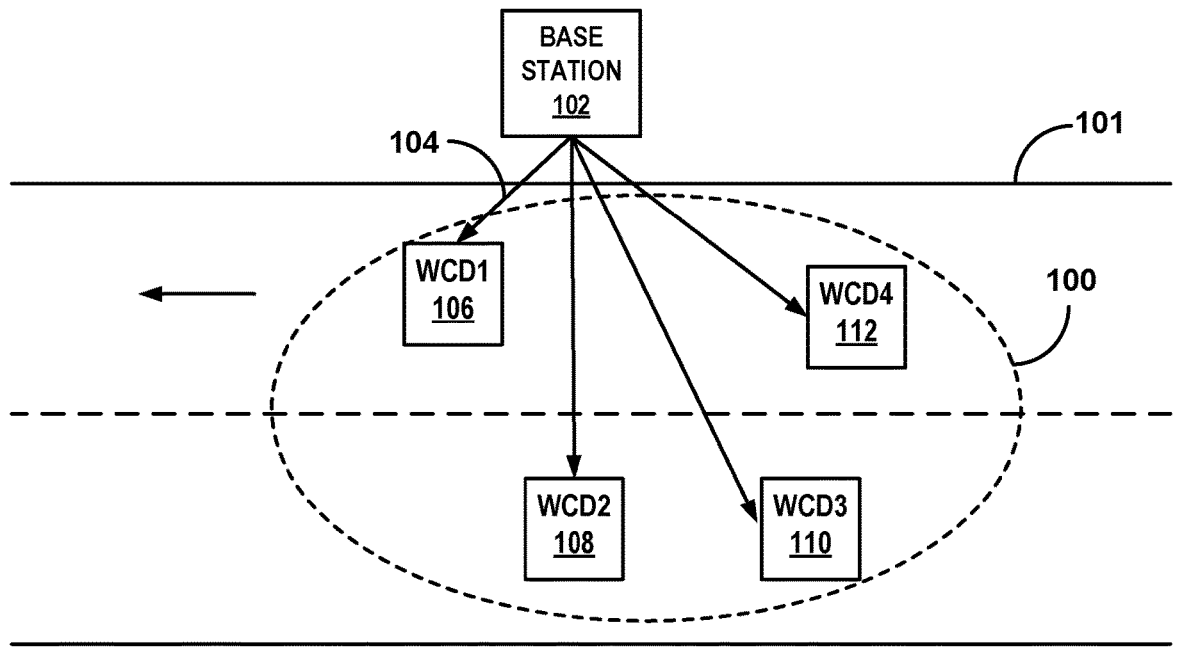
FIG. 1A is a block diagram of an example of a system in which a wireless communication device, which is a node of a vehicle ad-hoc network (VANET), receives broadcast information regarding a reservation channel resource pool and selects time-frequency resources to use for a reservation channel transmission to at least one other wireless communication device, which is another node of the VANET.

The examples discussed below are generally directed to vehicle-to-vehicle (V2V) communication between two or more vehicles that are part of a vehicle ad-hoc network (VANET). However, any of the following examples may be applied to vehicle-to-everything (V2X) communication, which is the passing of information from a vehicle to any entity that may affect the vehicle or that the vehicle may affect. For example, V2X is a vehicular communication system that incorporates other, more specific types of communication, including V2V, V2I (vehicle-to-infrastructure), V2N (vehicle-to-network), V2P (vehicle-to-pedestrian), V2D (vehicle-to-device), and V2G (vehicle-to-grid). Some examples of V2X protocols include Long-Term Evolution (LTE) (Rel-14) V2X Mode 4 and 5G New Radio (NR) V2X Mode 2.

In order to minimize the number of data transmission collisions in a VANET, a wireless communication device interested in transmitting data transmits a reservation channel, which indicates resources to be used for the data transmission at a future time. The other wireless communication devices in the VANET receive and decode this reservation channel transmission in order to identify the resources that will be used by the transmitting wireless communication device for future data transmissions. In order to avoid collisions, the other wireless communication devices take the resources identified in the reservation channel transmission into account when selecting transmission resources that will be used for their respective future data transmissions.

In accordance with one example of a resource selection method, a wireless communication device that is interested in transmitting data uses long-term sensing to discover which resources are already periodically being used by one or more other wireless communication devices. When an actual data packet arrives at the wireless communication device, the wireless communication device uses short-term sensing to detect, among the remaining idle resources, an idle set of resources. The wireless communication device then transmits a reservation channel transmission to reserve resources, which were identified as being idle, for a future data transmission. However, such a methodology can, in some cases, be problematic since there are still potential problems with collisions of the reservation channel transmissions.

One method to avoid collisions between the reservation channel transmissions is to assign orthogonal resources. For example, in a time-division multiplexing (TDM) case, wireless communication device A and wireless communication device B transmit their reservation channel transmissions in time slots $t_A$ and $t_B$, respectively. However, the assignment of time slots to the wireless communication devices (1) requires additional signaling overhead, and (2) may not be efficient since such a system utilizes resources to transmit the reservation channel transmissions that could otherwise be used for data transmissions.

The examples set forth herein describe a system in which a network configures (e.g., allocates) reservation channel resources within a reservation channel resource pool. In some cases, the time-frequency resources available to use for reservation channel transmissions are distributed periodically in a time-frequency domain. In other cases, the time-frequency resources available to use for reservation channel transmissions are distributed non-periodically in a time-frequency domain. For example, the time-frequency resources available to use for reservation channel transmissions could be distributed in a pre-determined manner (e.g., deterministically) within the time-frequency domain. Regardless of the type of distribution, the wireless communication devices are made aware of the distribution/location of the reservation channel resources so that the wireless communication devices can attempt to decode the reservation channel transmissions at the appropriate location (e.g., within the time-frequency domain).

FIG. 1A is a block diagram of an example of a system in which a wireless communication device, which is a node of a vehicle ad-hoc network (VANET), receives broadcast information regarding a reservation channel resource pool and selects time-frequency resources to use for a reservation channel transmission to at least one other wireless communication device, which is another node of the VANET. For the example of FIG. 1A, VANET 100 is located on roadway 101 and includes first wireless communication device, WCD1, 106, second wireless communication device, WCD2, 108, third wireless communication device, WCD3, 110, and fourth wireless communication device, WCD4, 112. In other examples, VANET 100 may have a different number of wireless communication devices than that shown in FIG. 1A.

VANET 100 is wirelessly connected to a radio access network (not shown) via base station 102, which provides various wireless services to one or more of the wireless communication devices that are part of VANET 100. For the example shown in FIG. 1A, VANET 100 operates in accordance with at least one revision of the 3rd Generation Partnership Project Long Term Evolution (3GPP LTE) communication specification. In other examples, VANET 100 may operate in accordance with other communication specifications.

In the interest of clarity and brevity, only one base station 102 is shown in FIG. 1A. However, in other examples, any suitable number of base stations may be utilized by VANET 100 in order to obtain/maintain communication with the network. For the example shown in FIG. 1A, base station 102, sometimes referred to as eNodeB or eNB, communicates with wireless communication devices 106, 108, 110, 112 via wireless communication link 104.

For the example shown in FIG. 1A, wireless communication link 104 is shown as a broadcast downlink signal from base station 102 to wireless communication devices 106, 108, 110, 112. Wireless communication devices 106, 108, 110, 112 are also capable of transmitting uplink signals (not shown) to base station 102. In the example of FIG. 1A, wireless communication devices 106, 108, 110, 112 are each integrated into a vehicle as an onboard unit (OBU). In other examples, wireless communication devices 106, 108, 110, 112 may simply be user equipment (UE) devices that are located within a vehicle. Some examples of user equipment devices include: a mobile phone, a transceiver modem, a personal digital assistant (PDA), or a tablet, for example. Each wireless communication device 106, 108, 110, 112 that is connected to VANET 100 is considered to be a node of VANET 100.

Figure 2A:
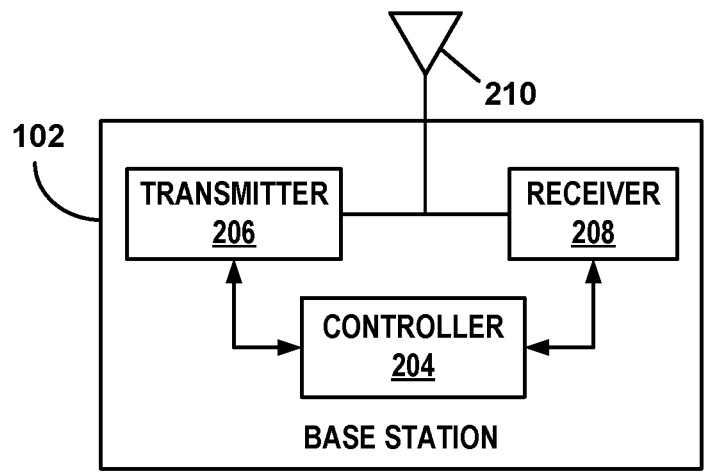
FIG. 2A is a block diagram of an example of the base station shown in FIG. 1.

Base station 102 is connected to the network through a backhaul (not shown) in accordance with known techniques. As shown in FIG. 2A, base station 102 comprises controller 204, transmitter 206, and receiver 208, as well as other electronics, hardware, and code. Base station 102 is any fixed, mobile, or portable equipment that performs the functions described herein. The various functions and operations of the blocks described with reference to base station 102 may be implemented in any number of devices, circuits, or elements. Two or more of the functional blocks may be integrated in a single device, and the functions described as performed in any single device may be implemented over several devices.

For the example shown in FIG. 2A, base station 102 may be a fixed device or apparatus that is installed at a particular location at the time of system deployment. Examples of such equipment include fixed base stations or fixed transceiver stations. In some situations, base station 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, base station 102 may be a portable device that is not fixed to any particular location. Accordingly, base station 102 may be a portable user device such as a UE device in some circumstances.

Controller 204 includes any combination of hardware, software, and/or firmware for executing the functions described herein as well as facilitating the overall functionality of base station 102. An example of a suitable controller 204 includes code running on a microprocessor or processor arrangement connected to memory.

Transmitter 206 includes electronics configured to transmit wireless signals. In some situations, transmitter 206 may include multiple transmitters. Receiver 208 includes electronics configured to receive wireless signals. In some situations, receiver 208 may include multiple receivers. Receiver 208 and transmitter 206 receive and transmit signals, respectively, through antenna 210. Antenna 210 may include separate transmit and receive antennas. In some circumstances, antenna 210 may include multiple transmit and receive antennas.

Transmitter 206 and receiver 208 in the example of FIG. 2A perform radio frequency (RF) processing including modulation and demodulation. Receiver 208, therefore, may include components such as low noise amplifiers (LNAs) and filters. Transmitter 206 may include filters and amplifiers. Other components may include isolators, matching circuits, and other RF components. These components in combination or cooperation with other components perform the base station functions. The required components may depend on the particular functionality required by the base station.

Transmitter 206 includes a modulator (not shown), and receiver 208 includes a demodulator (not shown). The modulator modulates the signals to be transmitted as part of the downlink signal 104 and can apply any one of a plurality of modulation orders. The demodulator demodulates any uplink signals received at base station 102 in accordance with one of a plurality of modulation orders.

As mentioned above, base station 102 provides (1) various wireless services to one or more wireless communication devices 106, 108, 110, 112, (2) network connectivity to VANET 100, and (3) information regarding the reservation channel resource pool. In some examples, the information regarding the reservation channel resource pool is a configuration (e.g., allocation) of reservation channel resources within a reservation channel pool. In some cases, the time-frequency resources available to use for reservation channel transmissions are distributed periodically in a time-frequency domain. In other cases, the time-frequency resources available to use for reservation channel transmissions are distributed non-periodically in a time-frequency domain. For example, the time-frequency resources available to use for reservation channel transmissions can be distributed in a pre-determined manner (e.g., deterministically) within the time-frequency domain.

Figure 2B:
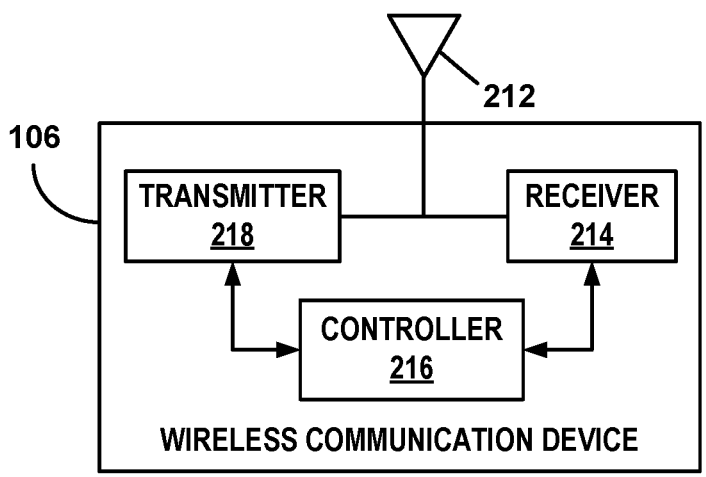
FIG. 2B is a block diagram of an example of a wireless communication device shown in FIG. 1.

As shown in FIG. 2B, wireless communication device 106 comprises controller 216, transmitter 218, and receiver 214, as well as other electronics, hardware, and code. Although FIG. 2B specifically depicts the circuitry and configuration of wireless communication device 106, the same wireless communication device circuitry and configuration is utilized for wireless communication devices 108, 110, 112 in VANET 100. Wireless communication device 106 is any fixed, mobile, or portable equipment that performs the functions described herein. The various functions and operations of the blocks described with reference to wireless communication device 106 may be implemented in any number of devices, circuits, or elements. Two or more of the functional blocks may be integrated in a single device, and the functions described as performed in any single device may be implemented over several devices.

Controller 216 includes any combination of hardware, software, and/or firmware for executing the functions described herein as well as facilitating the overall functionality of a wireless communication device. An example of a suitable controller 216 includes code running on a microprocessor or processor arrangement connected to memory. Transmitter 218 includes electronics configured to transmit wireless signals. In some situations, the transmitter 218 may include multiple transmitters. Receiver 214 includes electronics configured to receive wireless signals. In some situations, receiver 214 may include multiple receivers. Receiver 214 and transmitter 218 receive and transmit signals, respectively, through antenna 212. Antenna 212 may include separate transmit and receive antennas. In some circumstances, antenna 212 may include multiple transmit and receive antennas.

Transmitter 218 and receiver 214 in the example of FIG. 2B perform radio frequency (RF) processing including modulation and demodulation. Receiver 214, therefore, may include components such as low noise amplifiers (LNAs) and filters. Transmitter 218 may include filters and amplifiers. Other components may include isolators, matching circuits, and other RF components. These components in combination or cooperation with other components perform the wireless communication device functions. The required components may depend on the particular functionality required by the wireless communication device.

Transmitter 218 includes a modulator (not shown), and receiver 214 includes a demodulator (not shown). The modulator can apply any one of a plurality of modulation orders to modulate the signals to be transmitted as uplink signals (not shown). The demodulator demodulates the downlink signals 104 in accordance with one of a plurality of modulation orders.

In operation, base station 102 transmits, via transmitter 206 and antenna 210, broadcast downlink signal 104 to wireless communication devices 106, 108, 110, 112. In the example of FIG. 1A, the downlink signal 104 is transmitted in a System Information Block (SIB) message that is broadcast to all wireless communication devices 106, 108, 110, 112 that are nodes of VANET 100. Downlink signal 104 contains information regarding the reservation channel resource pool, which has been configured by the network of which base station 102 is a part. In some examples, the information regarding the reservation channel resource pool is a configuration (e.g., allocation) of reservation channel resources within a reservation channel pool. In some cases, the time-frequency resources available to use for reservation channel transmissions are distributed periodically in a time-frequency domain. In other cases, the time-frequency resources available to use for reservation channel transmissions are distributed non-periodically in a time-frequency domain. For example, the time-frequency resources available to use for reservation channel transmissions can be distributed in a pre-determined manner (e.g., deterministically) within the time-frequency domain.

Wireless communication devices 106, 108, 110, 112 each receive downlink signal 104 via their respective antennas 212 and receivers 214. Based on the information regarding the reservation channel resource pool received via signal 104, wireless communication device 106 selects, from the reservation channel resource pool, time-frequency resources to use for a reservation channel transmission. After selecting the time-frequency resources, wireless communication device 106 transmits, to wireless communication devices 108, 110, 112, a reservation channel transmission (not shown) using the selected time-frequency resources. Wireless communication device 106 transmits the reservation channel transmission via its transmitter 218 and antenna 212. Wireless communication devices 108, 110, 112 receive the reservation channel transmission via their respective antennas 212 and receivers 214.

In some examples, the reservation channel transmission includes one or more of the following: a transmitting device identifier, an intended receiving device identifier, and resource location information associated with a future data transmission. The transmitting device identifier identifies the transmitting wireless communication device 106. The intended receiving device identifier identifies one or more receiving wireless communication devices 108, 110, 112 for which the reservation channel transmission is intended. The resource location information indicates the time-frequency location, within a time-frequency domain, of a future data transmission that will be transmitted by the transmitting wireless communication device 106. The reservation channel transmission may also include at least one demodulation reference signal (DM-RS) symbol.

Thus, wireless communication devices 108, 110, 112 are informed of the distribution/location of the reservation channel resources so that wireless communication devices 108, 110, 112 can attempt to decode the reservation channel transmissions from wireless communication device 106 at the appropriate location (e.g., within the time-frequency domain). Although the foregoing description focused on wireless communication device 106 as transmitting the reservation channel transmission (e.g., the transmitting wireless communication device) and wireless communication devices 108, 110, 112 as receiving the reservation channel transmission (e.g., the receiving wireless communication devices), wireless communication devices 108, 110, 112 are also capable of transmitting their own respective reservation channel transmissions.

Figure 1B:
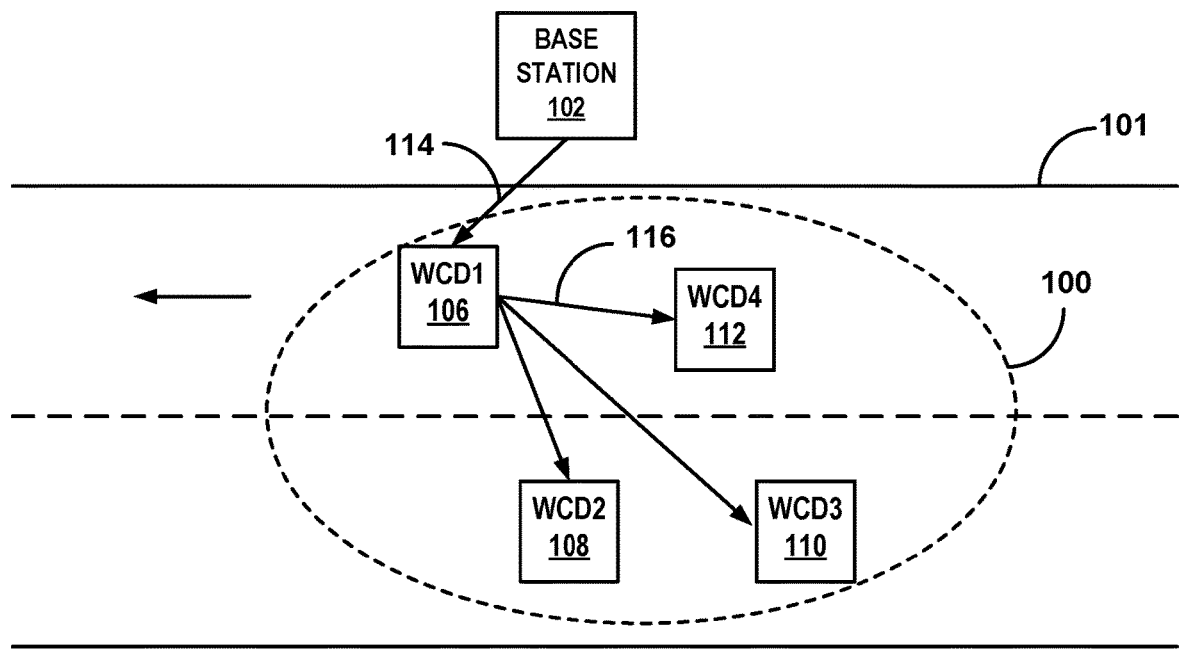
FIG. 1B is a block diagram of an example of a system in which a wireless communication device, which is a node of a vehicle ad-hoc network (VANET), receives information regarding a reservation channel resource pool and forwards the information to at least one other wireless communication device, which is another node of the VANET.

FIG. 1B is a block diagram of an example of a system in which a wireless communication device, which is a node of a vehicle ad-hoc network (VANET), receives information regarding a reservation channel resource pool and forwards the information to at least one other wireless communication device, which is another node of the VANET. The example shown in FIG. 1B is similar to the example of FIG. 1A. However, base station 102 of FIG. 1B does not broadcast the information regarding the reservation channel resource pool, which has been configured by the network, to wireless communication devices 106, 108, 110, 112.

For example, base station 102 transmits, via transmitter 206 and antenna 210, the information regarding the reservation channel resource pool, which has been configured by the network of which base station 102 is a part, to wireless communication device 106. The transmission of the information regarding the reservation channel resource pool is shown as downlink signal 114. Wireless communication device 106 receives downlink signal 114 via antenna 212 and receiver 214.

In the example shown in FIG. 1B, after receiving the information regarding the reservation channel resource pool, wireless communication device 106 transmits (e.g., forwards) the information regarding the reservation channel resource pool to at least one other wireless communication device 108, 110, 112 in VANET 100. This type of information forwarding is useful in cases in which multiple vehicles are being operated as a platoon (e.g., platooning). For example, if wireless communication device 106 was assigned as a group leader for a platoon, which included wireless communication devices 106, 108, 110, 112, wireless communication device 106 could forward information to the other wireless communication devices 108, 110, 112 in the platoon to facilitate operation of the platoon.

However, in other examples, wireless communication device 106 modifies (e.g., further configures/allocates) the reservation channel resources from the reservation channel resource pool before transmitting the modified information regarding the reservation channel resource pool to at least one other wireless communication device 108, 110, 112 in VANET 100. For example, wireless communication device 106 may select particular reservation channel resources from the reservation channel resource pool and assign the selected reservation channel resources to one or more particular wireless communication devices 108, 110, 112 in VANET 100.

In the example of FIG. 1B, wireless communication device 106 utilizes transmitter 218 and antenna 212 to transmit the information regarding the reservation channel resource pool to wireless communication devices 108, 110, 112. The transmission of information regarding the reservation channel resource pool to wireless communication devices 108, 110, 112 is shown as broadcast signal 116 in FIG. 1B. However, in other examples, wireless communication device 106 may transmit the information regarding the reservation channel resource pool to fewer than all of the other wireless communication devices 108, 110, 112 in VANET 100.

In the example of FIG. 1B, wireless communication devices 108, 110, 112 receive broadcast signal 116 via their respective antennas 212 and receivers 214. Besides the fact that the information regarding the reservation channel resource pool is forwarded to wireless communication devices 108, 110, 112 via wireless communication device 106, the operation of wireless communication devices 106, 108, 110, 112 is similar to that described in connection with FIG. 1A.

Figure 3:
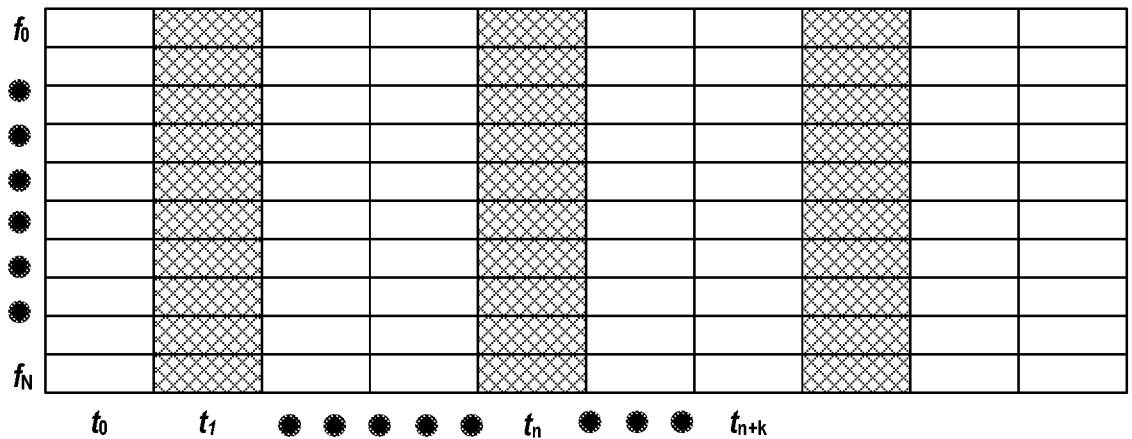
FIG. 3 is a diagram of an example in which the time-frequency resources available to use for reservation channel transmissions are distributed periodically in a time-frequency domain.

FIG. 3 is a diagram of an example in which the time-frequency resources available to use for reservation channel transmissions are distributed periodically in a time-frequency domain. For the example shown in FIG. 3, time-frequency domain 300 is provided where time, t, is represented on the horizontal axis and frequency, f, is represented on the vertical axis. Each box in the 10×10 grid of time-frequency domain 300 represents a time-slot that has both a corresponding time and frequency. Each of the time-slots of time-frequency domain 300 may be allocated by the network to be utilized as resources for data transmissions or resources for reservation channel transmissions.

In the example shown in FIG. 3, the network has configured (e.g., allocated) 3 columns of time-slots, which are distributed periodically in time-frequency domain 300 and are filled in with cross-hatching, to be utilized in VANET 100 for reservation channel transmissions. Although a particular periodic distribution of allocated time-slots has been shown in the example of FIG. 3, any other suitable periodic distribution and/or number of allocated time-slots may be used, in other examples. Regardless of the particular distribution and number of allocated time-slots, base station 102 transmits, to one or more wireless communication devices 106, 108, 110, 112, information regarding this periodic distribution of time-frequency resources that are available to use for reservation channel transmissions.

Figure 4:
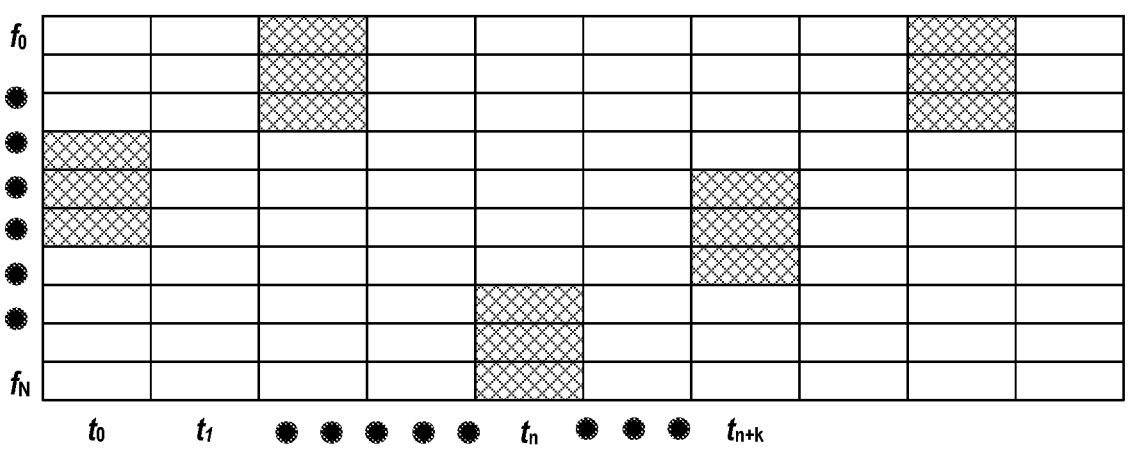
FIG. 4 is a diagram of an example in which the time-frequency resources available to use for reservation channel transmissions are distributed in a pre-determined manner within the time-frequency domain.

In other cases, the time-frequency resources available to use for reservation channel transmissions are distributed non-periodically in a time-frequency domain. FIG. 4 is a diagram of an example in which the time-frequency resources available to use for reservation channel transmissions are distributed in a non-periodic, pre-determined manner within the time-frequency domain. For the example shown in FIG. 4, time-frequency domain 400 is provided where time, t, is represented on the horizontal axis and frequency, f, is represented on the vertical axis. Each box in the 10×10 grid of time-frequency domain 400 represents a time-slot that has both a corresponding time and frequency. Each of the time-slots of time-frequency domain 400 may be allocated by the network to be utilized as resources for data transmissions or resources for reservation channel transmissions.

In the example shown in FIG. 4, the network has utilized a pre-determined algorithm or formula to configure (e.g., allocate) 5 groups of time-slots, which are distributed non-periodically in time-frequency domain 400 and are filled in with cross-hatching, to be utilized in VANET 100 for reservation channel transmissions. Although a particular distribution and number of allocated time-slots has been shown in the example of FIG. 4, any other suitable distribution and number of allocated time-slots may be used, in other examples. In still other cases, the allocated time-slots for reservation channel transmissions are uniformly distributed within time-frequency domain 400. Base station 102 transmits, to one or more wireless communication devices 106, 108, 110, 112, information regarding the non-periodic distribution of time-frequency resources that are available to use for reservation channel transmissions.

Figure 5A:
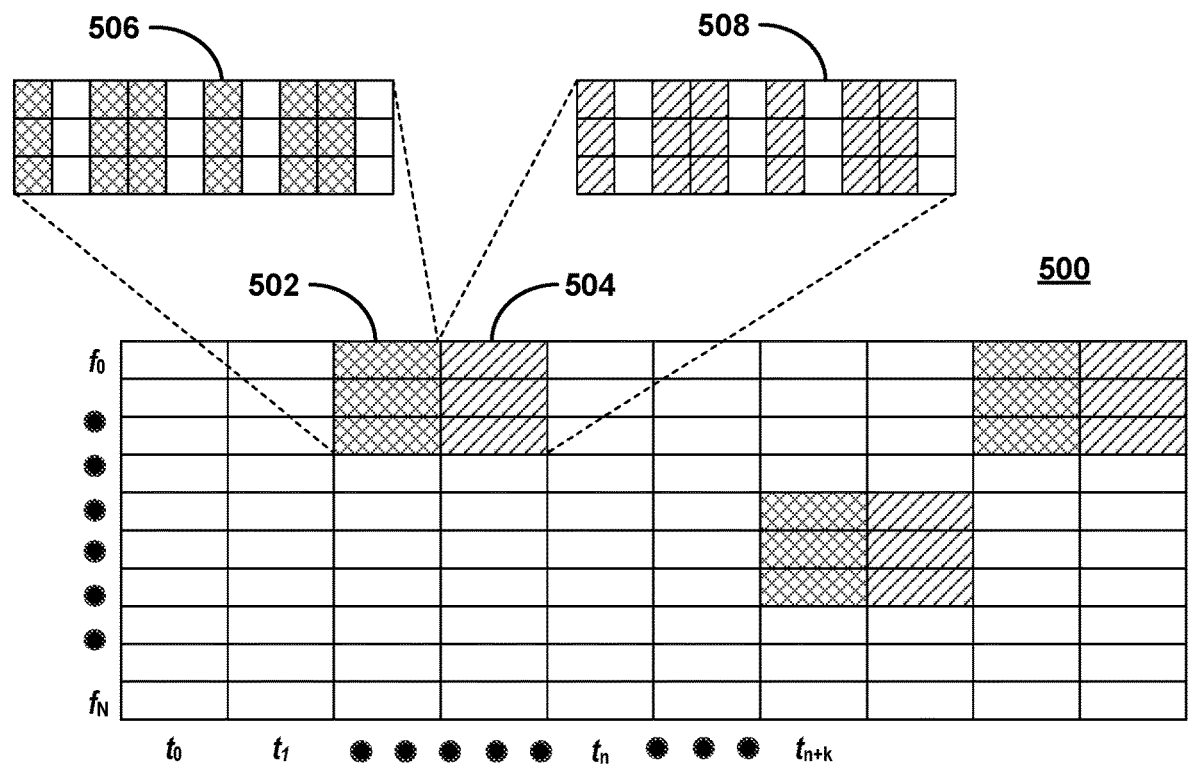
FIG. 5A is a diagram of an example in which a reservation channel transmission is transmitted over a first number of mini-slots in a first time-slot and a confirmation channel transmission is transmitted over a second number of mini-slots in a second time-slot.

FIG. 5A is a diagram of an example in which a reservation channel transmission is transmitted over a first number of mini-slots in a first time-slot and a confirmation channel transmission is transmitted over a second number of mini-slots in a second time-slot. For the example shown in FIG. 5A, time-frequency domain 500 is provided where time, t, is represented on the horizontal axis and frequency, f, is represented on the vertical axis. Each box in the 10×10 grid of time-frequency domain 500 represents a time-slot that has both a corresponding time and frequency.

Each of the time-slots of time-frequency domain 500 may be allocated by the network to be utilized as resources for data transmissions, reservation channel transmissions, or confirmation channel transmissions. The reservation channel resource pool is comprised of the time-slots that are allocated for reservation channel transmissions. At least one time-slot of the reservation channel resource pool is further divided into a set of mini-slots.

In the example shown in FIG. 5A, the network has utilized a pre-determined algorithm or formula to configure (e.g., allocate) 3 groups of time-slots, which are distributed non-periodically in time-frequency domain 500 and are filled in with cross-hatching, to be utilized in VANET 100 for reservation channel transmissions. In the example shown in FIG. 5A, the network has also utilized a pre-determined algorithm or formula to configure (e.g., allocate) 3 groups of time-slots, which are distributed non-periodically in time-frequency domain 500 and are filled in with hatching, to be utilized in VANET 100 for confirmation channel transmissions. Although a particular distribution and number of allocated time-slots has been shown in the example of FIG. 5A, any other suitable distribution and number of allocated time-slots may be used, in other examples. In still other cases, the allocated time-slots for reservation channel transmissions and confirmation channel transmissions could be uniformly distributed within time-frequency domain 500.

In the example shown in FIG. 5A, a first group of time-slots 502 allocated for reservation channel transmissions is 3 $F_s$ wide in the frequency domain, where $F_s$ is the width of a single frequency band within time-frequency domain 500, and 1 time-slot long in the time domain. The first group of time-slots 502 is further divided into a first set of mini-slots 506. Each mini-slot of the first set of mini-slots 506 is 3 $F_s$ wide in the frequency domain and 1 mini-slot long in the time domain. Thus, the first set of mini-slots 506 has 10 mini-slots, each of which is 3 $F_s$ wide in the frequency domain and 1 mini-slot long in the time domain. In other examples, the first group of time-slots 502 may have any other suitable number and/or configuration of time-slots. Likewise, the first set of mini-slots 506 may have any other suitable number of mini-slots, in other examples.

In the example shown in FIG. 5A, a second group of time-slots 504 allocated for confirmation channel transmissions is 3 $F_s$ wide in the frequency domain, where $F_s$ is the width of a single frequency band within time-frequency domain 500, and 1 time-slot long in the time domain. The second group of time-slots 504 is further divided into a second set of mini-slots 508. Each mini-slot of the second set of mini-slots 508 is 3 $F_s$ wide in the frequency domain and 1 mini-slot long in the time domain. Thus, the second set of mini-slots 508 has 10 mini-slots, each of which is 3 $F_s$ wide in the frequency domain and 1 mini-slot long in the time domain. In other examples, the second group of time-slots 504 may have any other suitable number and/or configuration of time-slots. Likewise, the second set of mini-slots 508 may have any other suitable number of mini-slots, in other examples.

Base station 102 transmits, to one or more wireless communication devices 106, 108, 110, 112, information regarding the non-periodic distribution of time-frequency resources (e.g., reservation channel resource pool) that are available to use for reservation channel transmissions. Upon receipt of the information regarding the reservation channel resource pool, wireless communication device 106 selects, from the reservation channel resource pool, time-frequency resources to use for a reservation channel transmission. In the example shown in FIG. 5A, wireless communication device 106 selects the first group of time-slots 502 for a reservation channel transmission.

Wireless communication device 106 further selects a first number of mini-slots over which to repeatedly transmit the reservation channel transmission. The selected first number of mini-slots, m, is 1 m M, where M is the total number of mini-slots in the time-slot. In the example shown in FIG. 5A, wireless communication device 106 may select a first number of mini-slots, m, between 1 and 10 since there are 10 mini-slots in the first set of mini-slots 506. As seen in FIG. 5A, wireless communication device 106 has selected 6 mini-slots, which are the 6 mini-slots filled in with cross-hatching in the first set of mini-slots 506. Of course, in other examples, wireless communication device 106 may select any other suitable first number of mini-slots.

In the example shown in FIG. 5A, wireless communication device 106 randomly selects the first number of mini-slots over which to repeatedly transmit the reservation channel transmission. For example, wireless communication device 106 can use a hashing function to select the number and/or location of the mini-slots, in some cases. In other examples, a mini-slot can contain a location of (e.g., a pointer to) another mini-slot over which the next copy of the reservation channel transmission will be sent. Such a configuration would enable wireless communication device 106 to randomly select the mini-slots. However, in further examples, wireless communication device 106 selects the first number of mini-slots based, at least partly, on channel conditions between wireless communication device 106 and at least one other wireless communication device 108.

After selecting the first number of mini-slots, wireless communication device 106 repeatedly transmits the reservation channel transmission over the selected first number of mini-slots. In the example shown in FIG. 5A, since wireless communication device 106 selected 6 mini-slots, wireless communication device 106 will repeatedly transmit the reservation channel transmission 6 times, using the selected mini-slots.

In response to the reservation channel transmissions, at least one other wireless communication device 108 transmits, to wireless communication device 106, one or more confirmation channel transmissions, each of which are repeatedly transmitted over a second number of mini-slots. More specifically, wireless communication device 108 randomly selects the second number of mini-slots, p, such that 1 p m, where m is the first number of mini-slots over which the reservation channel transmission was transmitted by wireless communication device 106. The second number of mini-slots, p, can be less than the first number of mini-slots, m, because the intended recipient of the reservation channel transmissions may not have received all of the, m, copies of the reservation channel transmission.

In the example shown in FIG. 5A, wireless communication device 108 may select a second number of mini-slots, p, between 1 and 6 since the first number of mini-slots, m, is 6. As seen in FIG. 5A, wireless communication device 108 has selected 6 mini-slots, which are the 6 mini-slots filled in with hatching in the second set of mini-slots 508. Of course, in other examples, wireless communication device 108 may select any other suitable second number of mini-slots.

In the example shown in FIG. 5A, wireless communication device 108 randomly selects the second number of mini-slots over which to repeatedly transmit the confirmation channel transmission. For example, wireless communication device 108 can use a hashing function to select the number and/or location of the mini-slots, in some cases. In other examples, a mini-slot can contain a location of (e.g., a pointer to) another mini-slot over which the next copy of the confirmation channel transmission will be sent. Such a configuration would enable wireless communication device 108 to randomly select the mini-slots. However, in further examples, wireless communication device 108 selects the second number of mini-slots based, at least partly, on channel conditions between wireless communication device 108 and wireless communication device 106.

After selecting the second number of mini-slots, wireless communication device 108 repeatedly transmits the confirmation channel transmission over the selected second number of mini-slots. In the example shown in FIG. 5A, since wireless communication device 108 selected 6 mini-slots, wireless communication device 108 repeatedly transmits the reservation channel transmission 6 times, using the selected number of mini-slots.

For the example of FIG. 5A, wireless communication device 108 selects the same set of mini-slots to transmit the confirmation channel transmissions that were used by wireless communication device 106 to transmit the corresponding reservation channel transmissions. More specifically, since wireless communication device 106 used the first, third, fourth, sixth, eighth, and ninth mini-slots in the first set of mini-slots 506 to transmit the reservation channel transmissions, wireless communication device 108 uses the first, third, fourth, sixth, eighth, and ninth mini-slots in the second set of mini-slots 508 to transmit the corresponding confirmation channel transmissions. However, any other suitable technique may be used for selecting which mini-slots will be used for the confirmation channel transmissions, in other examples.

Figure 5B:
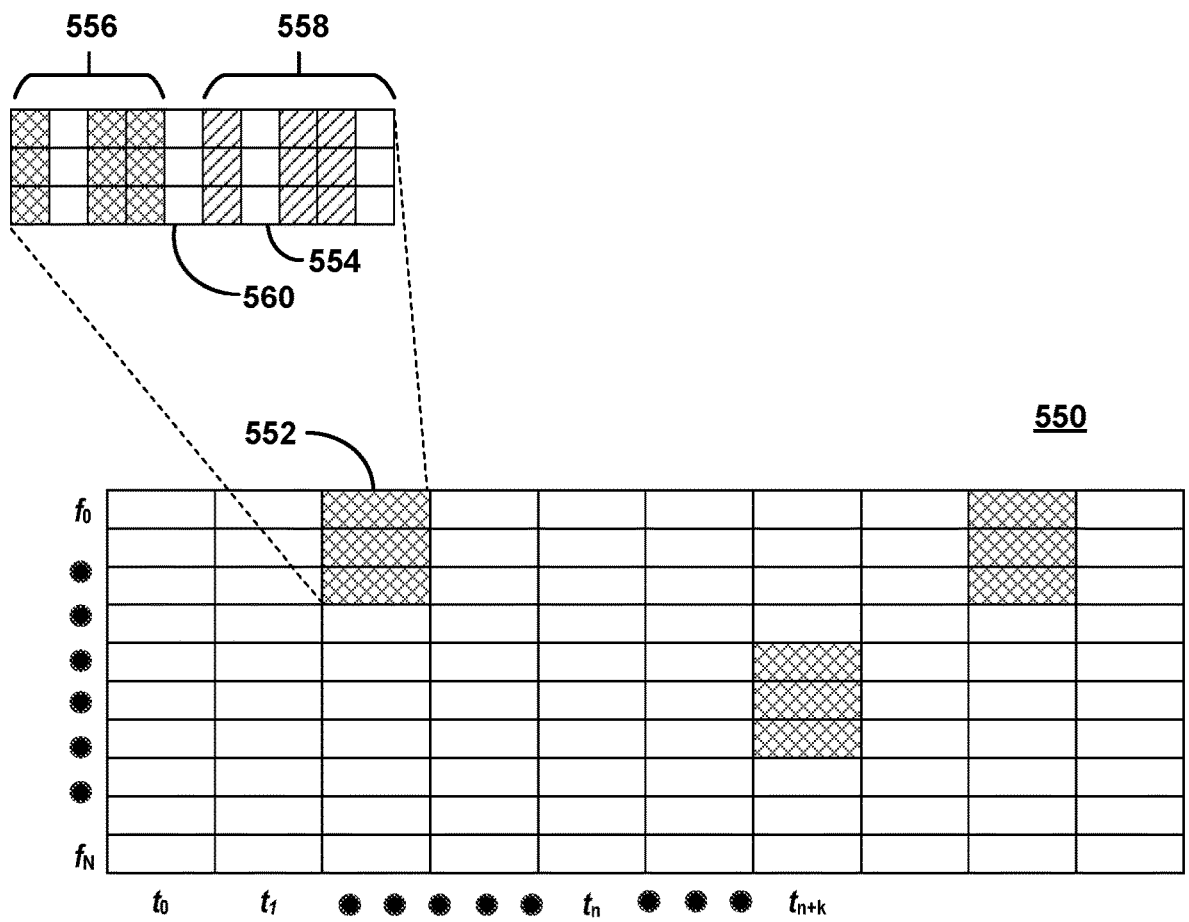
FIG. 5B is a diagram of an example in which a reservation channel transmission is transmitted over a first number of mini-slots in a first portion of a time-slot and a confirmation channel transmission is transmitted over a second number of mini-slots in a second portion of the time-slot.

FIG. 5B is a diagram of an example in which a reservation channel transmission is transmitted over a first number of mini-slots in a first portion of a time-slot and a confirmation channel transmission is transmitted over a second number of mini-slots in a second portion of the time-slot. The example shown in FIG. 5B is similar to the example shown in FIG. 5A except that if there is a sufficient number of mini-slots within the time-slot, the confirmation channel transmission(s) in FIG. 5B can be transmitted in a second portion of the same time-slot in which the reservation channel transmissions were transmitted. For the example shown in FIG. 5B, time-frequency domain 550 is provided where time, t, is represented on the horizontal axis and frequency, f, is represented on the vertical axis. Each box in the 10×10 grid of time-frequency domain 550 represents a time-slot that has both a corresponding time and frequency.

Each of the time-slots of time-frequency domain 550 may be allocated by the network to be utilized as resources for data transmissions, reservation channel transmissions, confirmation channel transmissions, or for reservation/confirmation channel transmissions. The reservation channel resource pool is comprised of the time-slots that are allocated for reservation channel transmissions. At least one time-slot of the reservation channel resource pool is further divided into a set of mini-slots.

In the example shown in FIG. 5B, the network has utilized a pre-determined algorithm or formula to configure (e.g., allocate) 3 groups of time-slots, which are distributed non-periodically in time-frequency domain 550 and are filled in with cross-hatching, to be utilized in VANET 100 for reservation/confirmation channel transmissions. Although a particular distribution and number of allocated time-slots has been shown in the example of FIG. 5B, any other suitable distribution and number of allocated time-slots may be used, in other examples. In still other cases, the allocated time-slots for reservation/confirmation channel transmissions could be uniformly distributed within time-frequency domain 550.

In the example shown in FIG. 5B, a first group of time-slots 552 allocated for reservation/confirmation channel transmissions is 3 $F_s$ wide in the frequency domain, where $F_s$ is the width of a single frequency band within time-frequency domain 550, and 1 time-slot long in the time domain. The first group of time-slots 552 is further divided into a first set of mini-slots 554. Each mini-slot of the first set of mini-slots 554 is 3 $F_s$ wide in the frequency domain and 1 mini-slot long in the time domain. Thus, the first set of mini-slots 554 has 10 mini-slots, each of which is 3 $F_s$ wide in the frequency domain and 1 mini-slot long in the time domain. In other examples, the first group of time-slots 552 may have any other suitable number and/or configuration of time-slots. Likewise, the first set of mini-slots 554 may have any other suitable number of mini-slots, in other examples.

Base station 102 transmits, to one or more wireless communication devices 106, 108, 110, 112, information regarding the non-periodic distribution of time-frequency resources (e.g., reservation channel resource pool) that are available to use for reservation channel transmissions. Upon receipt of the information regarding the reservation channel resource pool, wireless communication device 106 selects, from the reservation channel resource pool, time-frequency resources to use for reservation/confirmation channel transmissions. In the example shown in FIG. 5B, wireless communication device 106 selects the first group of time-slots 552 for reservation/confirmation channel transmissions.

Wireless communication device 106 further selects, from a first portion 556 of at least one time-slot, a first number of mini-slots over which to repeatedly transmit the reservation channel transmission. The selected first number of mini-slots, m, is 1 m M, where M is the total number of mini-slots in the time-slot. In the example shown in FIG. 5B, wireless communication device 106 may select a first number of mini-slots, m, between 1 and 10 since there are 10 mini-slots in the first set of mini-slots 554. As seen in FIG. 5B, wireless communication device 106 has selected 3 mini-slots, which are the 3 mini-slots filled in with cross-hatching in the first set of mini-slots 554. Of course, in other examples, wireless communication device 106 may select any other suitable first number of mini-slots.

In the example shown in FIG. 5B, wireless communication device 106 randomly selects the first number of mini-slots over which to repeatedly transmit the reservation channel transmission. For example, wireless communication device 106 can use a hashing function to select the number and/or location of the mini-slots, in some cases. In other examples, a mini-slot can contain a location of (e.g., a pointer to) another mini-slot over which the next copy of the reservation channel transmission will be sent. Such a configuration would enable wireless communication device 106 to randomly select the mini-slots. However, in further examples, wireless communication device 106 selects the first number of mini-slots based, at least partly, on channel conditions between wireless communication device 106 and at least one other wireless communication device 108. In still other examples, the location of the selected mini-slots is restricted to a first portion 556 of the time-slot, in which the first set of mini-slots 554 are located, to enable reception of corresponding confirmation channel transmissions in a second portion 558 of the time-slot.

After selecting the first number of mini-slots, wireless communication device 106 repeatedly transmits the reservation channel transmission over the selected first number of mini-slots. In the example shown in FIG. 5B, since wireless communication device 106 selected 3 mini-slots, wireless communication device 106 will repeatedly transmit the reservation channel transmission 3 times, using the selected mini-slots.

In response to the reservation channel transmissions, at least one other wireless communication device 108 transmits, to wireless communication device 106, one or more confirmation channel transmissions, each of which are repeatedly transmitted over a second number of mini-slots. More specifically, wireless communication device 108 randomly selects the second number of mini-slots, p, such that 1 p m, where m is the first number of mini-slots over which the reservation channel transmission was transmitted by wireless communication device 106. The second number of mini-slots, p, can be less than the first number of mini-slots, m, because the intended recipient of the reservation channel transmissions may not have received all of the, m, copies of the reservation channel transmission.

In the example shown in FIG. 5B, wireless communication device 108 may select a second number of mini-slots, p, between 1 and 3 since the first number of mini-slots, m, is 3. As seen in FIG. 5B, wireless communication device 108 has selected 3 mini-slots, which are the 3 mini-slots filled in with hatching in the second portion 558 of the time-slot in which the reservation channel transmissions were made. Of course, in other examples, wireless communication device 108 may select any other suitable second number of mini-slots.

In the example shown in FIG. 5B, the time-slot has a switching gap 560 between the first portion 556 of the time-slot, in which the reservation channel transmissions are made, and the second portion 558 of the time-slot, in which the confirmation channel transmissions are made. The switching gap 560 is one mini-slot in length. However, in other examples, switching gap 560 is one or more orthogonal frequency-division multiplexing (OFDM) symbols in length.

In the example shown in FIG. 5B, wireless communication device 108 randomly selects the second number of mini-slots over which to repeatedly transmit the confirmation channel transmission. For example, wireless communication device 108 can use a hashing function to select the number and/or location of the mini-slots, in some cases. In other examples, a mini-slot can contain a location of (e.g., a pointer to) another mini-slot over which the next copy of the confirmation channel transmission will be sent. Such a configuration would enable wireless communication device 108 to randomly select the mini-slots. However, in further examples, wireless communication device 108 selects the second number of mini-slots based, at least partly, on channel conditions between wireless communication device 108 and wireless communication device 106.

After selecting the second number of mini-slots, wireless communication device 108 repeatedly transmits the confirmation channel transmission over the selected second number of mini-slots. In the example shown in FIG. 5B, since wireless communication device 108 selected 3 mini-slots, wireless communication device 108 repeatedly transmits the confirmation channel transmission 3 times, using the selected number of mini-slots.

For the example of FIG. 5B, wireless communication device 108 selects the same set of mini-slots to transmit the confirmation channel transmissions that were used by wireless communication device 106 to transmit the corresponding reservation channel transmissions. More specifically, since wireless communication device 106 used the first, third, and fourth mini-slots in the first portion 556 of the first set of mini-slots 554 to transmit the reservation channel transmissions, wireless communication device 108 uses the first, third, and fourth mini-slots in the second portion 558 of the first set of mini-slots 554 to transmit the corresponding confirmation channel transmissions. However, any other suitable technique may be used for selecting which mini-slots will be used for the confirmation channel transmissions, in other examples.

Figure 6:
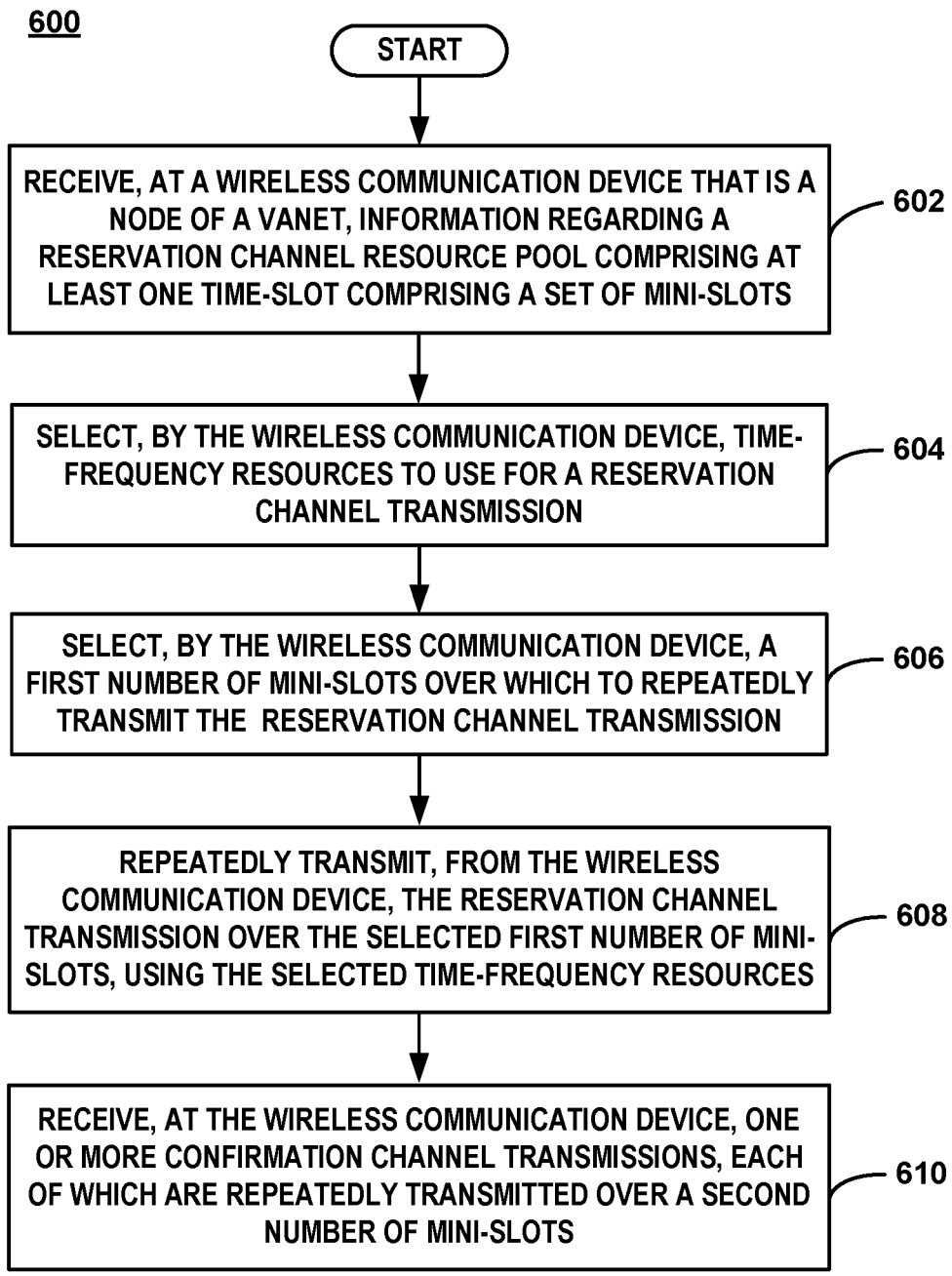
FIG. 6 is a flowchart of an example of a method in which a wireless communication device repeatedly transmits a reservation channel transmission, to at least one other wireless communication device, and receives one or more confirmation channel transmissions from the at least one other wireless communication device.

FIG. 6 is a flowchart of an example of a method in which a wireless communication device repeatedly transmits a reservation channel transmission, to at least one other wireless communication device, and receives one or more confirmation channel transmissions from the at least one other wireless communication device. The method 600 begins at step 602 with receiving, at wireless communication device 106, which is a node of VANET 100, information regarding a reservation channel resource pool. The reservation channel resource pool comprises at least one time-slot comprising a set of mini-slots. At step 604, wireless communication device 106 selects time-frequency resources to use for a reservation channel transmission. The time-frequency resources are selected from the reservation channel resource pool. At step 606, wireless communication device 106 selects a first number of mini-slots over which to repeatedly transmit the reservation channel transmission. At step 608, wireless communication device 106 repeatedly transmits, to at least one other wireless communication device 108, 110, 112 that is another node of VANET 100, the reservation channel transmission over the selected first number of mini-slots, using the selected time-frequency resources. At step 610, wireless communication device 106 receives, from at least one other wireless communication device 108, 110, 112 that is another node of VANET 100, one or more confirmation channel transmissions, each of which are repeatedly transmitted over a second number of mini-slots. In other examples, one or more of the steps of method 600 may be omitted, combined, performed in parallel, or performed in a different order than that described herein or shown in FIG. 6. In still further examples, additional steps may be added to method 600 that are not explicitly described in connection with the example shown in FIG. 6.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
   selecting, by a wireless communication device, time-frequency resources to use for a reservation channel transmission, the time-frequency resources selected from a reservation channel resource pool, the reservation channel resource pool comprising at least one time-slot comprising a set of mini-slots;
   selecting, by the wireless communication device, a first number of mini-slots over which to repeatedly transmit the reservation channel transmission;
   repeatedly transmitting, by the wireless communication device, the reservation channel transmission over the selected first number of mini-slots, using the selected time-frequency resources; and
   receiving, at the wireless communication device, one or more confirmation channel transmissions, each of which are repeatedly transmitted over a second number of mini-slots.

2. The method of claim 1, wherein the wireless communication device is a node of a vehicle ad-hoc network (VANET).

3. The method of claim 2, wherein repeatedly transmitting the reservation channel transmission comprises:
   repeatedly transmitting the reservation channel transmission to at least one other wireless communication device that is another node of the VANET.

4. The method of claim 1, wherein the time-frequency resources available to use for reservation channel transmissions are distributed periodically in a time-frequency domain.

5. The method of claim 1, wherein the time-frequency resources available to use for reservation channel transmissions are distributed non-periodically in a time-frequency domain.

6. The method of claim 5, wherein the time-frequency resources available to use for reservation channel transmissions are distributed deterministically within the time-frequency domain.

7. The method of claim 1, wherein the reservation channel transmission comprises:
   a transmitting device identifier;
   an intended receiving device identifier; and
   resource location information associated with a future data transmission.

8. The method of claim 1, wherein the reservation channel transmission comprises at least one demodulation reference signal (DM-RS) symbol.

9. The method of claim 1, wherein selecting a first number of mini-slots comprises:
   randomly selecting a first number of mini-slots.

10. The method of claim 1, wherein selecting a first number of mini-slots comprises:
    selecting a first number of mini-slots based, at least partly, on channel conditions between the wireless communication device and at least one other wireless communication device.

11. The method of claim 1, wherein the second number of mini-slots are randomly selected.

12. The method of claim 1, wherein the second number of mini-slots is equal to or less than the first number of mini-slots.

13. The method of claim 1, wherein a set of mini-slots utilized to repeatedly transmit the confirmation channel transmissions is the same as a set of mini-slots utilized to repeatedly transmit the reservation channel transmissions.

14. The method of claim 1, wherein the reservation channel transmissions are transmitted in a first portion of the at least one time-slot, the confirmation channel transmissions transmitted in a second portion of the at least one time-slot, the at least one time-slot having a gap between the first portion and the second portion.

15. A wireless communication device comprising:
    a controller configured to:
       select time-frequency resources to use for a reservation channel transmission, the time-frequency resources selected from a reservation channel resource pool, the reservation channel resource pool comprising at least one time-slot comprising a set of mini-slots, and
       select a first number of mini-slots over which to repeatedly transmit the reservation channel transmission;
    a transmitter configured to repeatedly transmit the reservation channel transmission over the selected first number of mini-slots, using the selected time-frequency resources; and
    a receiver configured to receive one or more confirmation channel transmissions, each of which are repeatedly transmitted over a second number of mini-slots.

* * * * *